Aug. 16, 1966   W. M. J. CAIRNS   3,266,383
FLUID PRESSURE OPERATED CYLINDERS
Filed Nov. 19, 1963   2 Sheets-Sheet 1

INVENTOR
Wallace M. J. Cairns
BY Winter, Ray, Adams and Tockman
ATTORNEYS

Aug. 16, 1966  W. M. J. CAIRNS  3,266,383
FLUID PRESSURE OPERATED CYLINDERS
Filed Nov. 19, 1963  2 Sheets-Sheet 2

INVENTOR
Wallace M. J. Cairns
BY
Winter, Ray, Adams and Tockman
ATTORNEYS

United States Patent Office 3,266,383
Patented August 16, 1966

3,266,383
FLUID PRESSURE OPERATED CYLINDERS
Wallace M. J. Cairns, Leamington Spa, England, assignor to Automotive Products Company Limited, Leamington Spa, England
Filed Nov. 19, 1963, Ser. No. 324,780
Claims priority, application Great Britain, Nov. 22, 1962, 44,231/62
1 Claim. (Cl. 92—142)

This invention relates to fluid pressure operated cylinders for example slave cylinders and master cylinders used in fluid pressure operated systems and has for its object to provide improvements in the construction thereof which result in more economical production than hitherto, primarily by reducing the necessity of machining operations requiring skilled operatives.

According to the present invention, a fluid pressure operated cylinder for example a slave or master cylinder comprises a cylinder body formed from tubing one end of which is closed by a closure plug secured in the body and having an opening or openings for the passage of the fluid, the opposite end of the cylinder body being open and having an external flange to receive a cover plate provided with an aperture through which the piston of the cylinder can slide. The cover plate can be provided with a tubular extension which projects coaxially with the cylinder body the said extension forming a sleeve to enclose the piston when in a retracted position in which a part of the length projects outwardly of the cylinder body, the outer end of the sleeve being open, or provided with an opening for the passage of a connecting rod coupling the piston to the apparatus actuated thereby.

In addition, the tubular extension or sleeve at or adjacent its outer end, can be formed to provide or be provided with an abutment engageable by the outer end of the piston to provide a stop limiting the movement of the piston outwardly of the cylinder. The cylinder body can also be formed to provide a bore portion of the enlarged diameter for a portion of its length from the open end, the enlarged bore accommodating for example a seal or seals preventing leakage along the piston.

The construction of the present invention is particularly suitable for the production of master cylinders, and slave cylinders for use in hydraulically operated clutch actuated mechanisms and accordingly slave cylinders and master cylinders for such purpose, constructed in accordance with the invention will now be described by way of example by aid of the accompanying drawings in which.

Figure 1:
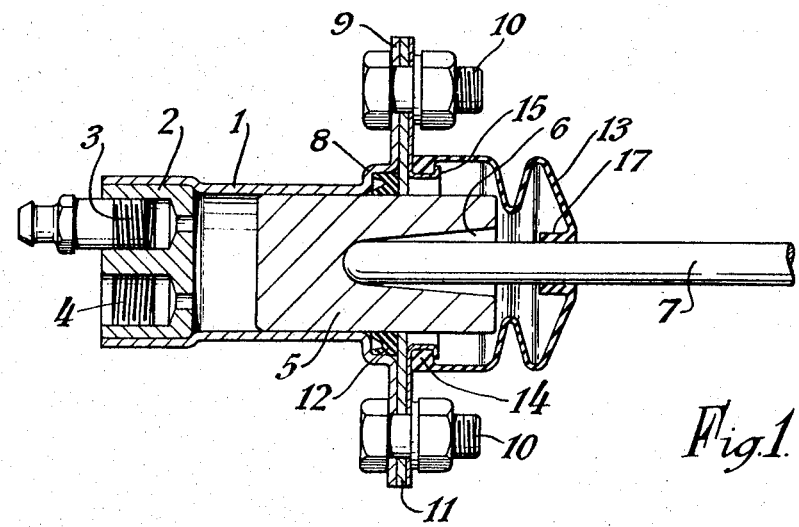
FIGURE 1 shows in longitudinal section a slave cylinder according to one embodiment.

A slave cylinder for a hydraulically operated clutch comprises generally a cylinder body the bore of which is open at one end to receive a piston the outer end of which is connectable through a connecting rod to the clutch release bearing, the opposite end of the cylinder bore being closed, the said closed end having a port for connection to for example a master cylinder for the supply of hydraulic liquid to the slave cylinder. FIGURE 1 of the accompanying drawings shows a slave cylinder of this general kind constructed in accordance with the invention.

Referring to FIGURE 1, the slave cylinder comprises a cylinder body 1 formed from metal tubing, for example seamless steel tubing, closed at one end by a plug 2 having a breather port 3 and a port 4 adapted for connection to a master cylinder, the cylinder bore containing a piston 5 which is provided with a recess 6 extending inwardly from its outer end to receive one end of a connecting rod 7 the opposite end of which is connectable to the clutch release bearing linkage. The end of the cylinder bore receiving the plug 2 is enlarged to provide a bore portion of enlarged diameter to accommodate a plug of corresponding size, the shoulder thus formed at the inner end of the enlarged diameter portion providing axial location for the plug inwardly of the bore, the plug being secured by brazing, peening or other suitable means.

At the opposite or open end of the bore of the tube forming cylinder 1 is formed to provide a portion 8 of enlarged diameter which extends inwardly for a short distance from the open end, the outer end of the enlarged diameter portion being surrounded by a flange 9. The flange is provided with bolt holes to receive bolts 10 securing a cover plate 11 to the flange, the cover plate 11 having an aperture which closely surrounds the piston 5 and thereby closes the open end of the enlarged diameter portion of the cylinder bore, the annular space around the piston formed by the enlarged bore portion accommodating a lip type seal 12 for preventing leakage around the piston.

A boot 13 of synthetic rubber or other resilient matrial is provided at the open end of the slave cylinder, the boot surrounding the outwardly projecting end of the piston 5 to prevent the deposit of dirt or other foreign matter on the piston. As shown, the beaded edge 14 of the booth engages in an annular groove 15 provided on a plate also secured in position by the bolts 10, the aperture 17 in the closed end of the boot embracing the connecting rod 7.

In the construction described above the end closure plugs are secured in the cylinder bore by brazing. However, other means can be used. For example the plug periphery can be provided with recesses spaced therearound, the surrounding tube wall being punched into the recesses at the appropriate points. A combination of welding, or brazing and tube deformation can be used.

A pedal operated master cylinder used for supply hydraulic liquid to the slave cylinder of a hydraulically actuated clutch comprises generally a cylinder body the bore of which contains a piston. The outer end of the piston is connectable by a connecting rod to the pedal linkage. Inward movement of the piston in the cylinder bore from a retracted position of rest, upon depression of the pedal displaces hydraulic liquid from the cylinder space between the inner end of the piston and the opposite closed end of the bore through a port in the closed end which is connectable to the slave cylinder. In accordance with the invention the master cylinder is similar in construction to that of the slave cylinder above disclosed and embodiments thereof will now be described with reference to FIGURES 2 and 3 of the accompanying drawings.

Figure 2:
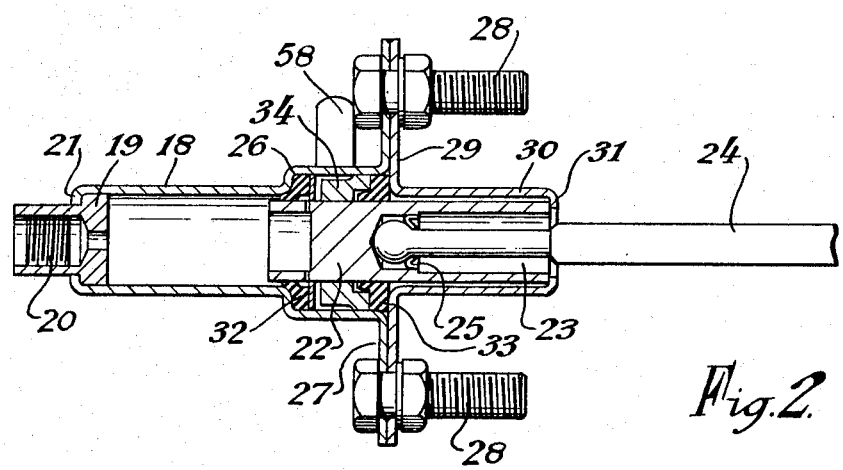
FIGURE 2 shows in longitudinal section a master cylinder with fluid supplied from a remotely situated reservoir.

In the construction according to FIGURE 2 of the accompanying drawings the cylinder body 18 of the master cylinder is made from metal tube preferably seamless steel tube. The cylinder bore is closed at one end by a closure plug 19 having an axial port 20, the plug being secured in position by brazing and axially secured in the outward direction by turning radially inwardly the surrounding edge of the tube to form a retaining lip 21. A piston 22, shown in the non-operative or retracted position, is slidable in the cylinder bore the piston having a recess 23 extending axially inwards from the outer end thereof to receive one end of a connecting rod 24 which is secured by a friction ring 25, the opposite end of the connecting rod being connectable to the pedal or operating gear through a suitable linkage. As the push rod is held in the recess by the friction ring 25, return movement of the piston 22 to the retracted position can be effected by the clutch springs of the clutch assembly. Thus it is unnecessary to provide a piston return spring in the master cylinder bore. At the opposite or open end of the cylinder bore the tube is formed to provide a portion 26 of enlarged diameter which extends inwardly from the open end, the outer end of the enlarged diameter portion being surrounded by a flange 27. The flange is provided with bolt holes to receive bolts 28 securing an end plate 29 to the flange, the cover plate being formed centrally to provide an outwardly extending sleeve 30 which surrounds the piston. A radially inwardly extending shoulder 31 at the outer end of the sleeve 30 provides a stop engageable by the outer end of the piston to limit the outward movement of the piston. The annular space formed between the portion 26 of enlarged diameter and the periphery of the piston provides a housing for sealing members 32 and 33 respectively and a bearing bush 34 for the piston. A port (not shown) in the master cylinder body is connectable by a pipe 58 to a tank or reservoir separate from the master cylinder.

Figure 3:
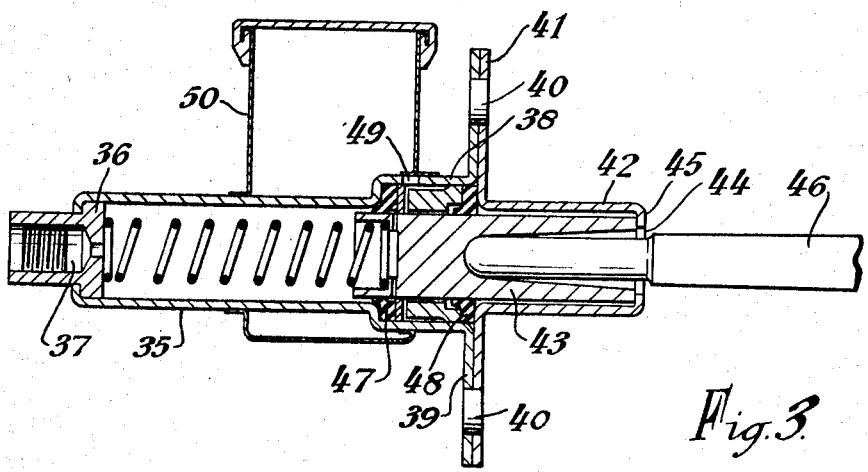
FIGURE 3 shows in longitudinal section a master cylinder for example, for hydraulic clutch actuating system, the master cylinder having a tank mounted thereon.

In the construction according to FIGURE 3 of the drawings the cylinder body 35 is formed from metal tubing, preferably seamless steel tube, the bore of which is closed at one end by a closure plug 36 secured axially in position and having a port 37 extending axially therethrough. At the opposite or open end of the cylinder body the bore is enlarged to provide a portion 38 of larger diameter than the cylinder bore extending inwardly from the end of the cylinder body, the outer end of the tube being formed to provide an external flange 39. The flange 39 has bolt holes 40 to receive bolts (not shown) securing a cover plate 41 in position which has a tubular extension 42 projecting outwardly from one side thereof. The tubular extension forms a sleeve into which the piston 43 of the master cylinder projects when in the rest or retracted position the outer end of the sleeve having an aperture 44 surrounded by an inwardly turned rim 45 which provides a stop limiting the outward movement of the piston of the master cylinder, the aperture also permitting the connection of a connecting rod 46 to the piston, the connecting rod at its outer end, being adapted for coupling to the foot pedal linkage. The enlarged diameter bore portion 38 of the cylinder body provides with the periphery of the piston 43 an annular space to receive sealing rings 47, 48 preventing leakage along the piston, and the wall of the cylinder body has a radial hole 49 through the thickness for connecting the cylinder body bore to a tank 50 containing hydraulic liquid.

The tank is mounted on the cylinder body and can be of metal or synthetic plastic material. In the latter case preferably a clear or translucent plastics material is used so that the level of the hydraulic liquid in the tank can readily be ascertained. The tank can be mounted on the cylinder body in any convenient manner either permanently or so as to be readily removable. In the arrangement shown in FIGURE 3, the tank wall is provided adjacent the lower end thereof with oppositely disposed holes and is mounted on the master cylinder by passing the cylinder body through the holes so that the same extends diametrically across the tank. When a metal tank is used the tank is secured in position by soft soldering or brazing around the outer edges of the holes so that the tank is permanently secured to the cylinder body and a sealed joint provided around the holes preventing leakage of hydraulic liquid.

Figure 4:
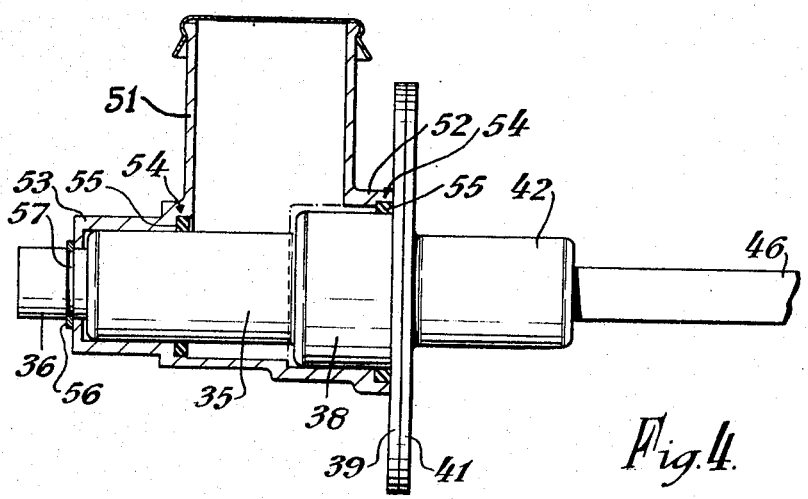
FIGURE 4 shows, the master cylinder of FIGURE 3, having a tank mounted thereon, the tank construction and its mounting being particularly suitable for tanks of synthetic plastics material.

FIGURE 4 of the accompanying drawings discloses an arrangement particularly suitable for the mounting of a tank of synthetic plastics material on a master cylinder as disclosed above in connection with FIGURE 3. The tank body 51 is provided with oppositely disposed outwardly extending tubular extensions or sleeves 52, 53 each of which fits closely around the outer periphery of the cylinder body. Each sleeve has an internal annular groove 54 to form with the cylinder body annular recesses to receive sealing rings 55 preventing leakage from the tank. The tank is located axially on the cylinder body by abutting the outer end of the sleeve 52 against the flange of the cylinder body, the outer end of the other sleeve 53 abutting a retaining ring 56 in an annular groove 57 in an outwardly projecting end of the closure plug of the cylinder body. With this latter construction the tank can be removed from the cylinder body simply by extracting the retaining ring and withdrawing the tank from the cylinder body. If desired the annular groove 57 can be provided in the periphery of the cylinder body.

I claim:

A fluid pressure operated cylinder for use as a master cylinder and the like comprising a one-piece seamless metal tube with an enlarged end section forming an annular longitudinal recess, the opposite end section having an inturned annular flange, a closure plug secured adjacent said inturned flange and having an axial port portion extending through said flange, a first sealing ring disposed in said recess, a bearing bushing disposed in said recess next to said first sealing ring, a second sealing ring disposed in said recess on the other side of said bushing, a slidable piston disposed in said tube havng an axial recess thereon facing away from said closure plug, said metal tube having an outwardly extending annular flange adjacent said annular recess, another metal tube having an outwardly extending annular flange abutting said first-mentioned metal tube outwardly extending annular flange and said second sealing ring, means securing said outwardly extending flanges together, said another tube having an inturned flange adjacent its other end to provide a stop for said piston, a connecting rod extending through said another tube and its inturned flange and into said axial recess, and a retainer ring securing said connecting rod within said piston.

References Cited by the Examiner

UNITED STATES PATENTS

| | | | |
|---|---|---|---|
| 1,971,048 | 8/1934 | Parsons | 91—417 |
| 1,974,467 | 9/1934 | Oliver | 60—54.6 |
| 1,983,884 | 12/1934 | Shaw et al. | 60—54.6 |
| 1,997,100 | 4/1935 | Boughton et al. | 60—54.6 |
| 2,725,719 | 12/1955 | Springmeier | 60—54.6 |
| 2,732,918 | 1/1956 | Hackworth | 60—54.6 |
| 2,755,629 | 7/1956 | Baisch | 60—54.6 |
| 2,805,551 | 9/1957 | Baldwin | 60—54.6 |
| 2,808,703 | 10/1957 | Baldwin | 60—54.6 |
| 2,880,043 | 3/1959 | Landis | 92—169 |
| 2,997,026 | 8/1961 | Zimmerer | 92—169 |
| 3,069,210 | 12/1962 | Rogers et al. | 287—21 |
| 3,143,933 | 8/1964 | Norton | 92—169 |
| 3,156,097 | 11/1964 | Broun | 60—54.6 |
| 3,163,093 | 12/1964 | Gut | 287—31 |
| 3,166,908 | 1/1965 | Chouings | 60—54.6 |

FOREIGN PATENTS 157,876  8/1939  Austria.

EDGAR W. GEOGHEGAN, *Primary Examiner.*

RICHARD B. WILKINSON, SAMUEL LEVINE,
*Examiners.*

H. G. SHIELDS, I. C. COHEN, *Assistant Examiners.*